United States Patent
Fujimoto et al.

(10) Patent No.: US 9,902,034 B2
(45) Date of Patent: Feb. 27, 2018

(54) AUTOMATIC TOOL CHANGER AND MACHINE TOOL

(71) Applicant: DMG MORI CO., LTD., Yamatokoriyama-shi (JP)

(72) Inventors: Koji Fujimoto, Yamatokoriyama (JP); Tatsuhiko Kuriya, Yamatokoriyama (JP); Hiroshi Shimanoe, Yamatokoriyama (JP); Osamu Kameo, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 201 days.

(21) Appl. No.: 14/823,444

(22) Filed: Aug. 11, 2015

(65) Prior Publication Data
US 2016/0067840 A1  Mar. 10, 2016

(30) Foreign Application Priority Data

Sep. 8, 2014 (JP) .................. 2014-182269

(51) Int. Cl.
*B23Q 3/155* (2006.01)
*B25J 5/02* (2006.01)
(Continued)

(52) U.S. Cl.
CPC ....... *B23Q 3/1554* (2013.01); *B23Q 3/15713* (2013.01); *B25J 5/02* (2013.01);
(Continued)

(58) Field of Classification Search
CPC ......... Y10T 483/1724; Y10T 483/1721; Y10T 483/1714; Y10T 483/1702;
(Continued)

(56) References Cited

U.S. PATENT DOCUMENTS 5,737,500 A * 4/1998 Seraji ................. B25J 9/1643
318/568.11
8,820,203 B2 * 9/2014 Sun .................... B25J 9/1664
318/568.21

(Continued)

FOREIGN PATENT DOCUMENTS

DE   195 10 498 A1   9/1996
DE   298 21 047 U1   5/1999
(Continued)

*Primary Examiner* — Daniel Howell
*Assistant Examiner* — Yasir Diab
(74) *Attorney, Agent, or Firm* — Oblon, McClelland, Maier & Neustadt, L.L.P.

(57) ABSTRACT

An automatic tool changer (ATC) serves as an ATC for automatically changing a tool attached to a lower tool rest of a machine tool. The ATC includes a robot arm and a movement mechanism unit moving the robot arm between inside and outside of a machining area. The robot arm has a base unit coupled to the movement mechanism unit, an arm unit pivotably coupled to the base unit, and a gripping unit provided in the arm unit and detachably gripping the tool. The arm unit is formed to extend in an arm shape from the base unit toward the gripping unit, and swings on a pivot axis as a fulcrum relative to the base unit. By such a configuration, an ATC implementing an automatic change of a tool by a simple and compact mechanism and a machine tool including such an ATC are provided.

7 Claims, 9 Drawing Sheets

(51) Int. Cl.
*B23Q 3/157* (2006.01)
*B25J 9/00* (2006.01)

(52) U.S. Cl.
CPC .............. *B23Q 3/15573* (2013.01); *B23Q 2003/155407* (2016.11); *B23Q 2003/155411* (2016.11); *B25J 9/0018* (2013.01); *Y10S 483/901* (2013.01); *Y10S 483/902* (2013.01); *Y10T 483/1724* (2015.01); *Y10T 483/1771* (2015.01)

(58) Field of Classification Search
CPC ......... Y10T 483/1705; Y10T 483/1771; Y10T 483/1769; Y10T 483/1767; Y10T 483/1779; Y10T 483/1783; Y10T 483/1786; Y10T 483/1788; B23Q 2003/155407; B23Q 2003/155411; B23Q 3/15573; B23Q 3/1554; B23Q 3/15513; B23Q 3/15713
USPC ..................................................... 901/15, 41
See application file for complete search history.

(56) References Cited

U.S. PATENT DOCUMENTS

| | | | | |
|---|---|---|---|---|
| 2006/0048364 | A1* | 3/2006 | Zhang | B23Q 17/0966 29/407.08 |
| 2006/0212169 | A1* | 9/2006 | Luthardt | B23K 11/314 700/245 |
| 2009/0253563 | A1* | 10/2009 | Kondo | B25J 15/04 483/46 |
| 2011/0015049 | A1* | 1/2011 | Grob | B23Q 3/1554 483/37 |
| 2011/0309782 | A1* | 12/2011 | Bonin | H02P 21/50 318/611 |
| 2012/0259464 | A1* | 10/2012 | Morioka | B25J 9/1674 700/254 |
| 2013/0166071 | A1* | 6/2013 | Kranz | B25J 9/1633 700/260 |

FOREIGN PATENT DOCUMENTS

| | | |
|---|---|---|
| DE | 299 02 127 U1 | 8/2000 |
| EP | 0 028 735 A2 | 5/1981 |
| EP | 2 067 570 A1 | 6/2009 |
| JP | 60-123243 | 7/1985 |
| JP | 60-117001 U | 8/1985 |
| JP | 6-238539 | 8/1994 |

* cited by examiner

AUTOMATIC TOOL CHANGER AND MACHINE TOOL

BACKGROUND OF THE INVENTION

Field of the Invention

The present invention relates to an automatic tool changer (ATC) and a machine tool.

Description of the Background Art

As to the conventional ATC, for example, Japanese Utility Model Laying-Open No. 60-117001 discloses a numerical-value controlling lathe equipped with an ATC, which aims at simplifying the operation of the ATC and shortening of the time required for changing a tool (PTD 1).

The numerical-value controlling lathe disclosed in PTD 1 includes an ATC for automatically changing a tool between a turret on a tool rest and a tool magazine. The ATC has a tool carrier that moves in the axial direction of a spindle and also in the direction orthogonal to the axial direction of the spindle while gripping the tool.

Furthermore, Japanese Patent Laying-Open No. 60-123243 discloses a machine tool equipped with a tool changer, which aims at providing cleaning means that allows easy cleaning on each guide plane when automatically changing a tool block in a linear reciprocating motion, and that has a simple structure but still reliably operates, and also allows further swift cleaning (PTD 2).

The machine tool disclosed in PTD 2 includes changing means for automatically changing a tool between a turret head on a tool rest and a tool magazine. The changing means has a gripper for gripping the tool, and is disposed so as to be capable of moving forward and backward between the turret head and the tool magazine.

Furthermore, Japanese Patent Laying-Open No. 06-238539 discloses a tool changer aiming at attaching/detaching a tool unit to/from a tool holder attached to a turret in parallel to the central axis line of the turret or at a right angle to this central axis line (PTD 3).

In the tool changer disclosed in PTD 3, near the turret, an X-Z stage is provided for holding a drive box so as to be movable in the directions at a right angle to and in parallel to the central axis line of the turret. A tool changing box having a tool hand for gripping the tool unit is swivelably provided in the drive box.

SUMMARY OF THE INVENTION

As disclosed in the above-described PTD 1 to PTD 3, various types of automatic tool changers (ATC) for automatically changing a tool attached to a tool rest (turret) of a machine tool are proposed. In such an ATC, it is required to implement an automatic change of a tool by a simple and compact mechanism in order to prevent an increase in size of the machine tool.

Accordingly, an object of the present invention is to solve the above-described problems, and to provide an ATC that implements an automatic change of a tool by a simple and compact mechanism, and a machine tool including such an ATC.

An ATC according to the present invention is provided as an ATC for automatically changing a tool attached to a tool rest of a machine tool. The ATC includes a robot arm and a movement mechanism unit moving the robot arm between inside and outside of a machining area. The robot arm has a base unit coupled to the movement mechanism unit, an arm unit pivotably coupled to the base unit, and a gripping unit provided in the arm unit and detachably gripping the tool. The arm unit is formed to extend in an arm shape from the base unit toward the gripping unit and swings on a pivot axis as a fulcrum relative to the base unit.

According to the ATC configured in this way, by moving the robot arm using the movement mechanism unit and by swinging the arm unit on the base unit as a fulcrum, the tool gripped by the gripping unit is moved and the attitude of this tool is changed. Accordingly, the tool can be automatically changed by a simple and compact mechanism.

Further preferably, the base unit is provided so as to be rotatable about a first rotation axis orthogonal to the pivot axis of the arm unit.

According to the ATC configured in this way, it becomes possible to increase the degree of freedom at the time when the tool gripped by the gripping unit is moved or when the attitude of the tool is changed.

Further preferably, the arm unit includes a first movable unit pivotably coupled to the base unit, a second movable unit pivotably coupled to the first movable unit, and a third movable unit pivotably coupled to the second movable unit and provided with the gripping unit. A first pivot axis between the base unit and the first movable unit, a second pivot axis between the first movable unit and the second movable unit, and a third pivot axis between the second movable unit and the third movable unit are arranged in parallel.

According to the ATC configured in this way, it becomes possible to increase the degree of freedom at the time when the tool gripped by the gripping unit is moved or when the attitude of the tool is changed.

Further preferably, the second movable unit is provided to extend in an arm shape in an axial direction of a second rotation axis orthogonal to the second pivot axis and to be rotatable about the second rotation axis. The third movable unit is provided to extend in an arm shape in an axial direction of a third rotation axis orthogonal to the third pivot axis and to be rotatable about the third rotation axis.

According to the ATC configured in this way, it becomes possible to increase the degree of freedom at the time when the tool gripped by the gripping unit is moved or when the attitude of the tool is changed.

A machine tool according to the present invention includes: the ATC described in any of the above; and a tool rest disposed within a machining area and equipped with a tool automatically changed by the ATC.

According to the machine tool configured in this way, the ATC is configured by a simple and compact mechanism, so that the machine tool can be decreased in size.

Further preferably, the tool is inserted from one direction into the tool rest when the tool is attached to the tool rest. The movement mechanism unit moves the robot arm in a direction parallel to an insertion direction of the tool into the tool rest.

According to the machine tool configured in this way, when the tool is attached to the tool rest, the movement mechanism unit moves the robot arm, so that the tool can be inserted into the tool rest.

Further preferably, the machine tool further includes a headstock provided within the machining area and rotating a workpiece. A pivot axis of the arm unit is orthogonal to a rotation axis of the workpiece in the headstock.

According to the machine tool configured in this way, the ATC can be configured in a compact manner particularly in the direction orthogonal to the rotation axis of the workpiece. Thereby, excellent accessibility for an operator to a headstock can be achieved at the time when the machine tool is used.

As described above, according to the present invention, it becomes possible to provide: an ATC that implements an automatic change of a tool by a simple and compact mechanism; and a machine tool including such an ATC.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
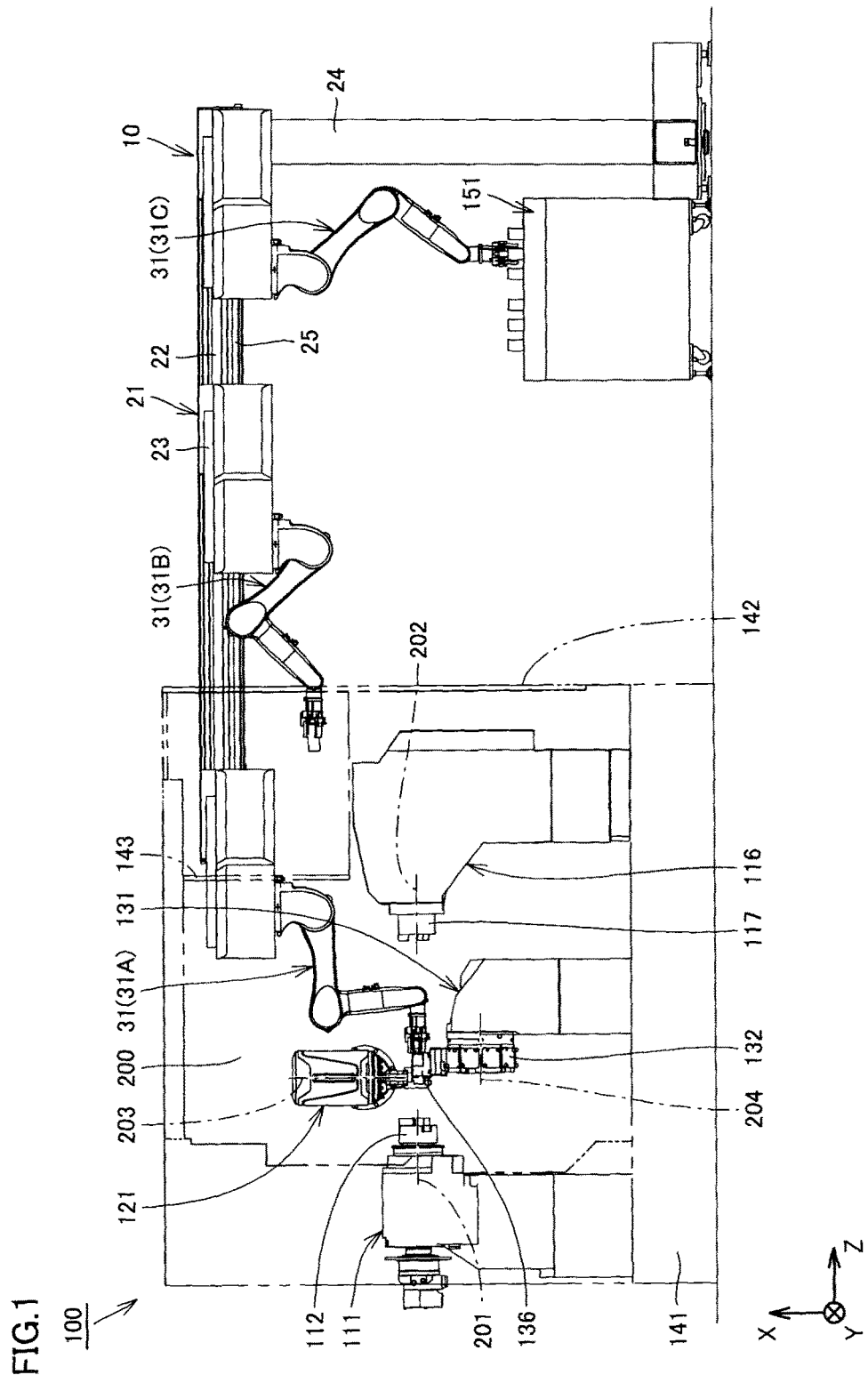
FIG. 1 is a front view showing a machine tool in the first embodiment of the present invention.

Embodiments of the present invention will be hereinafter described with reference to the accompanying drawings. In the drawings referred in the following, the same or corresponding components are designated by the same reference characters.

First Embodiment

FIG. 1 is a front view showing a machine tool in the first embodiment of the present invention. FIG. 1 is a perspective view of a cover body exhibiting an external appearance of the machine tool, which shows the inside of the machine tool.

Referring to FIG. 1, a machine tool 100 serves as a composite processing machine having a turning function using a fixed tool and a milling function using a rotating tool. First, the entire structure of machine tool 100 will be hereinafter described. Machine tool 100 includes a bed 141, a first headstock 111, a second headstock 116, a tool spindle 121, and a lower tool rest 131.

Bed 141 serves as a base member for supporting first headstock 111, second headstock 116, tool spindle 121, and lower tool rest 131, and is placed on an installation surface of a factory or the like.

First headstock 111 and second headstock 116 are disposed to face each other in the Z-axis direction extending in the horizontal direction. First headstock 111 and second headstock 116 have a spindle 112 and a spindle 117, respectively, for rotating a workpiece during the turning process using a fixed tool. Spindle 112 is provided so as to be rotatable about a central axis 201 parallel to the Z-axis while spindle 117 is provided so as to be rotatable about a central axis 202 parallel to the Z-axis. Spindle 112 and spindle 117 each are provided with a chuck mechanism for detachably holding a workpiece.

A tool spindle (upper tool rest) 121 rotates the rotating tool during milling processing using the rotating tool. Tool spindle 121 is provided so as to be rotatable about a central axis 203 parallel to the X-axis extending in the vertical direction. Tool spindle 121 is provided with a clamping mechanism for detachably holding the rotating tool.

Tool spindle 121 is supported on bed 141 by a column and the like (not shown). Tool spindle 121 is provided so as to be movable in the X-axis direction, in the Y-axis direction extending in the horizontal direction and orthogonal to the Z-axis direction, and in the Z-axis direction by various types of feed mechanisms, guide mechanisms, servo motors, and the like provided in the column and the like. The machining position by the rotating tool attached to tool spindle 121 is moved in a three-dimensional manner. Tool spindle 121 is provided so as to be also swivelable about a central axis parallel to the Y-axis.

Lower tool rest 131 is equipped with a plurality of fixed tools for a turning process. Lower tool rest 131, which has a so-called turret type, is equipped with a plurality of fixed tools in a radial manner, and serves to perform swivel indexing.

More specifically, lower tool rest 131 has a swivel unit 132. Swivel unit 132 is provided so as to be swivelable about a central axis 204 parallel to the Z-axis. At each of positions (10 positions in the present embodiment) disposed at intervals in the circumferential direction about central axis 204, tool holders for holding the fixed tools is attached. Swivel unit 132 swivels about central axis 204, thereby causing the fixed tools held by the tool holders to move in the circumferential direction, so that the fixed tools used for the turning process is indexed.

Lower tool rest 131 is supported on bed 141 by a saddle and the like that is not shown. Lower tool rest 131 is disposed so as to be movable in the X-axis direction and in the Z-axis direction by various types of feed mechanisms, guide mechanisms, servo motors and the like provided in the saddle and the like.

In the present embodiment, lower tool rest 131 incorporates a motor for rotating the rotating tool. The rotating force from the motor is transmitted to the rotating tool held by the tool holder, so that the rotating tool can be used in lower tool rest 131.

Then, the structure of an automatic tool changer (ATC) 10 included in machine tool 100 will be hereinafter described.

Machine tool 100 has an ATC 10 and a tool stocker 151. ATC 10 serves to automatically change a tool attached to lower tool rest 131. Tool stocker 151 is provided as a tool housing unit for housing a replacement tool to be attached to lower tool rest 131.

Machine tool 100 has a tool holder (for ATC) 136. Tool holder 136 is attached to lower tool rest 131 (swivel unit 132). Tool holder 136 incorporates a clamping mechanism for detachably holding the tool. ATC 10 automatically replaces the tool held by tool holder 136 among a plurality of tools attached to lower tool rest 131 with a tool housed in tool stocker 151. When the tool is attached to lower tool rest 131, the tool is inserted from the direction parallel to the Z-axis into tool holder 136.

Although not shown in FIG. 1, machine tool 100 includes, around first headstock 111, an ATC for automatically changing the tool attached to tool spindle 121 and a tool magazine housing replacement tools to be attached to tool spindle 121.

Machine tool 100 has a side cover 142. Side cover 142 is provided on the opposite side of first headstock 111 across second headstock 116. Side cover 142 provides a separation between the inside and the outside of machining area 200. Side cover 142 is provided with a shutter 143 that can be opened and closed. Tool stocker 151 is provided outside the machining area.

ATC 10 has a robot arm 31 and a movement mechanism unit 21. Robot arm 31 is provided so as to be capable of gripping the tool. Movement mechanism unit 21 moves robot arm 31 between the inside and the outside of machining area 200. Movement mechanism unit 21 moves robot arm 31 in a range of a tool changing position 31A within the machining area, a standby position 31B outside the machining area, and a stocker position 31C outside the machining area.

Movement mechanism unit 21 has a base member 23, a linear guide 22, a rack and pinion 25, a servo motor (not shown), and a support pillar 24 as a mechanism for causing robot arm 31 to linearly reciprocate.

Base member 23 is made of a plate material, and has robot arm 31 and the servo motor attached thereto. Linear guide 22 and rack and pinion 25 are placed by support pillar 24 at a certain height from the installation surface of machine tool 100. Linear guide 22 is provided as a guide mechanism for guiding base member 23 in the direction parallel to the Z-axis. Rack and pinion 25 converts the rotation output from the servo motor into linear motion, thereby moving base member 23 in the Z-axis direction.

During processing of the workpiece, robot arm 31 stands by at standby position 31B without gripping the tool. When processing of the workpiece is completed and replacement of the tool attached to lower tool rest 131 is required, shutter 143 is brought into an open state. Robot arm 31 moves into the machining area through an opening appearing in side cover 142, and reaches tool changing position 31A. Robot arm 31 grips the tool held by tool holder 136. Tool holder 136 releases clamping of the tool at the timing when the tool is gripped by robot arm 31. Robot arm 31 gripping the tool moves from tool changing position 31A to stocker position 31C (conveyance of the tool). Robot arm 31 returns the tool removed from lower tool rest 131 back to tool stocker 151.

Robot arm 31 grips a replacement tool prepared in tool stocker 151, and moves from stocker position 31C to tool changing position 31A (conveyance of the tool). Robot arm 31 inserts a new tool into tool holder 136. Tool holder 136 clamps the tool at the timing when the tool is inserted by robot arm 31. Robot arm 31 moves from tool changing position 31A to standby position 31B, and shutter 143 is brought into a closed state. Then, replacement of the tool by ATC 10 is completed.

Figure 2:
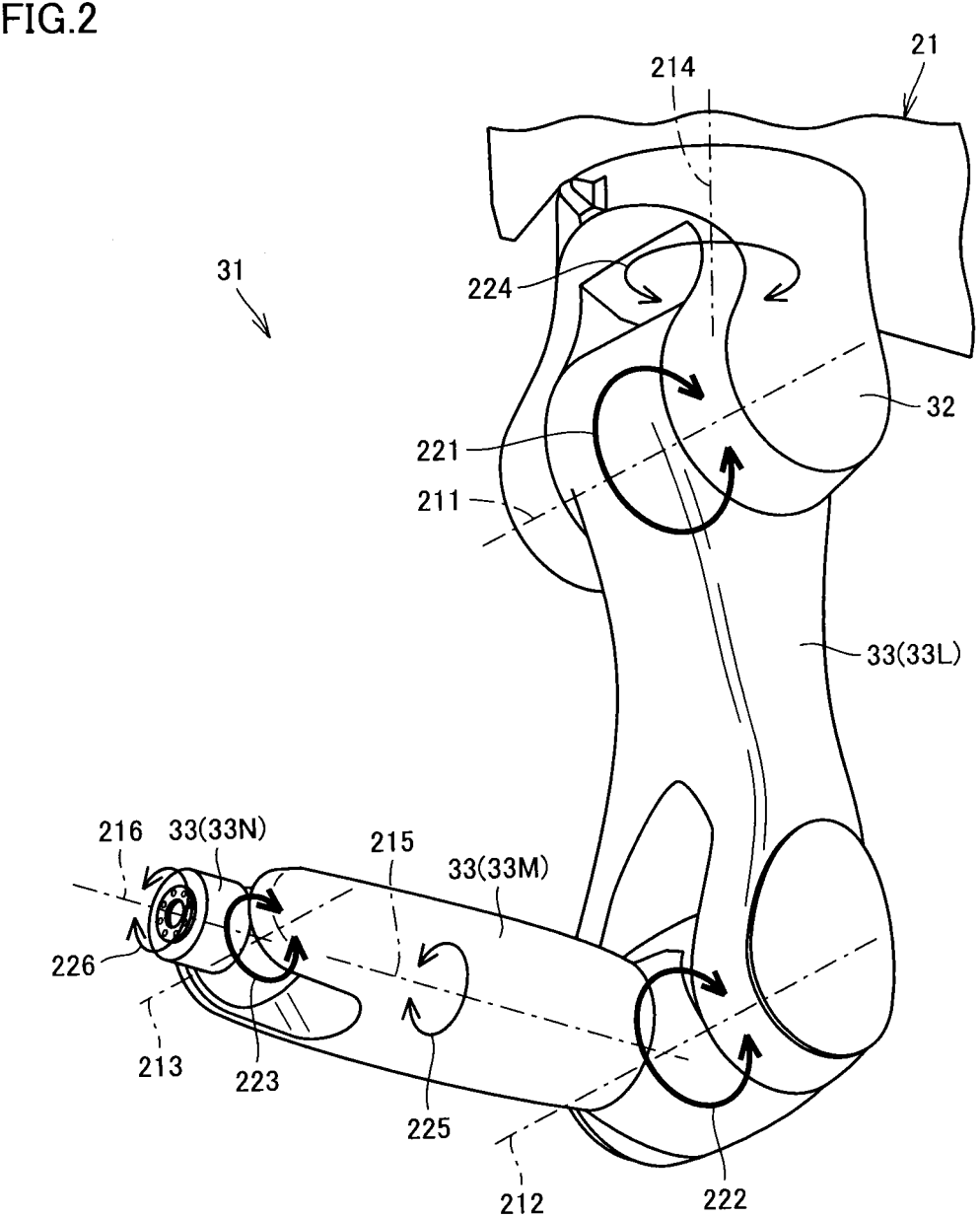
FIG. 2 is a perspective view showing a robot arm in FIG. 1.
Figure 3:
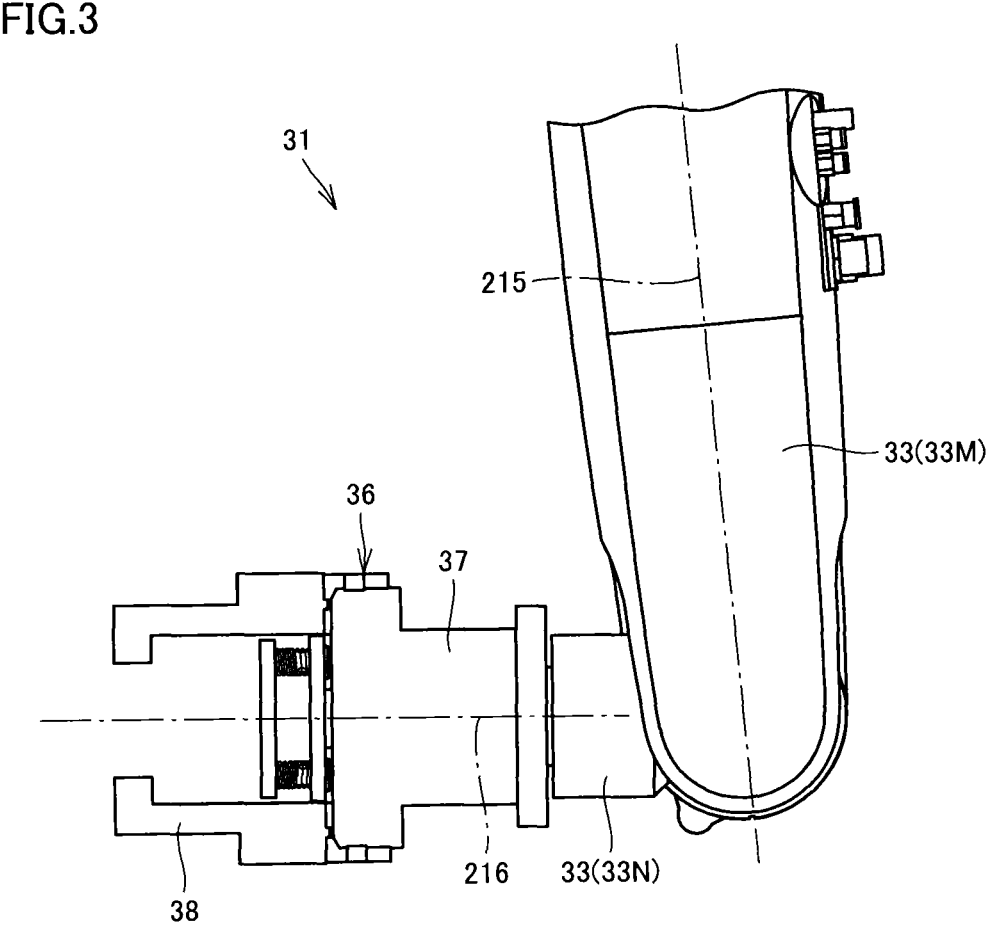
FIG. 3 is a side view showing an end portion of the robot arm in FIG. 2.

FIG. 2 is a perspective view showing a robot arm in FIG. 1. FIG. 3 is a side view showing an end portion of the robot arm in FIG. 2.

Referring to FIGS. 1 to 3, the structure of robot arm 31 will then be described in detail. Robot arm 31 has a base unit 32, an arm unit 33, and a gripping unit 36.

Base unit 32 is coupled to movement mechanism unit 21. Base unit 32 is shaped to protrude from movement mechanism unit 21 vertically in the downward direction. Arm unit 33 is coupled to base unit 32 so as to be pivotable about a pivot axis 211. In FIG. 2, pivot axis 211 extends in the direction parallel to the Y-axis. Gripping unit 36 is provided in arm unit 33. Gripping unit 36 detachably grips a tool. Gripping unit 36 is of a single-arm type capable of gripping one tool at a time.

Arm unit 33 is formed to extend in an arm shape from base unit 32 toward gripping unit 36. Arm unit 33 has one end and the other end provided with base unit 32 and gripping unit 36, respectively. Arm unit 33 is formed to extend in an arm shape in a plane orthogonal to pivot axis 211. Arm unit 33 swings on pivot axis 211 as a fulcrum as shown by an arrow 221 in FIG. 2. In accordance with swinging motion of arm unit 33, the position of the tool gripped by gripping unit 36 is changed in a plane orthogonal to pivot axis 211.

Arm unit 33 is formed of a first movable unit 33L, a second movable unit 33M, and a third movable unit 33N.

First movable unit 33L is coupled to base unit 32 so as to be pivotable about pivot axis 211 (the first pivot axis). First movable unit 33L is formed to extend from base unit 32 in an arm shape in the direction orthogonal to pivot axis 211. First movable unit 33L swings on pivot axis 211 as a fulcrum as shown by an arrow 221 in FIG. 2.

Second movable unit 33M is coupled to first movable unit 33L so as to be pivotable about pivot axis 212 (the second pivot axis). Pivot axis 212 extends in the direction parallel to pivot axis 211. Second movable unit 33M is coupled to the end of first movable unit 33L that extends from base unit 32 in an arm shape. Second movable unit 33M extends from first movable unit 33L in an arm shape in the direction orthogonal to pivot axis 212. Second movable unit 33M swings on pivot axis 212 as a fulcrum as shown by an arrow 222 in FIG. 2.

Third movable unit 33N is coupled to second movable unit 33M so as to be pivotable about pivot axis 213 (the third pivot axis). Pivot axis 213 extends in the direction parallel to pivot axis 211 and pivot axis 212. Third movable unit 33N is coupled to the end of second movable unit 33M that extends from first movable unit 33L in an arm shape. Third movable unit 33N extends from second movable unit 33M in an arm shape in the direction orthogonal to pivot axis 213. Third movable unit 33N swings on pivot axis 213 as a fulcrum as shown by an arrow 223 in FIG. 2.

Base unit 32 is provided so as to be rotatable about rotation axis 214 (the first rotation axis) as shown by an arrow 224 in FIG. 2. Rotation axis 214 extends in the direction orthogonal to pivot axis 211. Rotation axis 214 extends in the vertical direction.

Second movable unit 33M extends in an arm shape in the axial direction of a rotation axis 215 (the second rotation axis). Second movable unit 33M is provided so as to be rotatable about rotation axis 215 as shown by an arrow 225 in FIG. 2. Rotation axis 215 extends in the direction orthogonal to pivot axis 212. Third movable unit 33N extends in an arm shape in the axial direction of rotation axis 216 (the third rotation axis). Third movable unit 33N is provided so as to be rotatable about rotation axis 216 as shown by an arrow 226 in FIG. 2. Rotation axis 216 extends in the direction orthogonal to pivot axis 213.

By such a configuration, robot arm 31 is provided as a robot arm capable of controlling six axes (pivot axes 211 to 213 and rotation axes 214 to 216) independently from each other.

Gripping unit 36 is provided along an imaginary extension line of rotation axis 216 along which third movable unit 33N extends in an arm shape. Gripping unit 36 has a coupling portion 37 and a claw portion 38. Claw portion 38 is formed in a claw shape that can be engaged with a tool.

Claw portion 38 is provided on the outer circumference of the axis extended from rotation axis 216. Coupling portion 37 is provided as a coupling mechanism for coupling claw portion 38 to arm unit 33 (third movable unit 33N).

FIGS. 4 to 8 each are a side view illustrating movement of the robot arm at the time when automatically changing the tool attached to the lower tool rest in the machine tool in FIG. 1.

Figure 4:
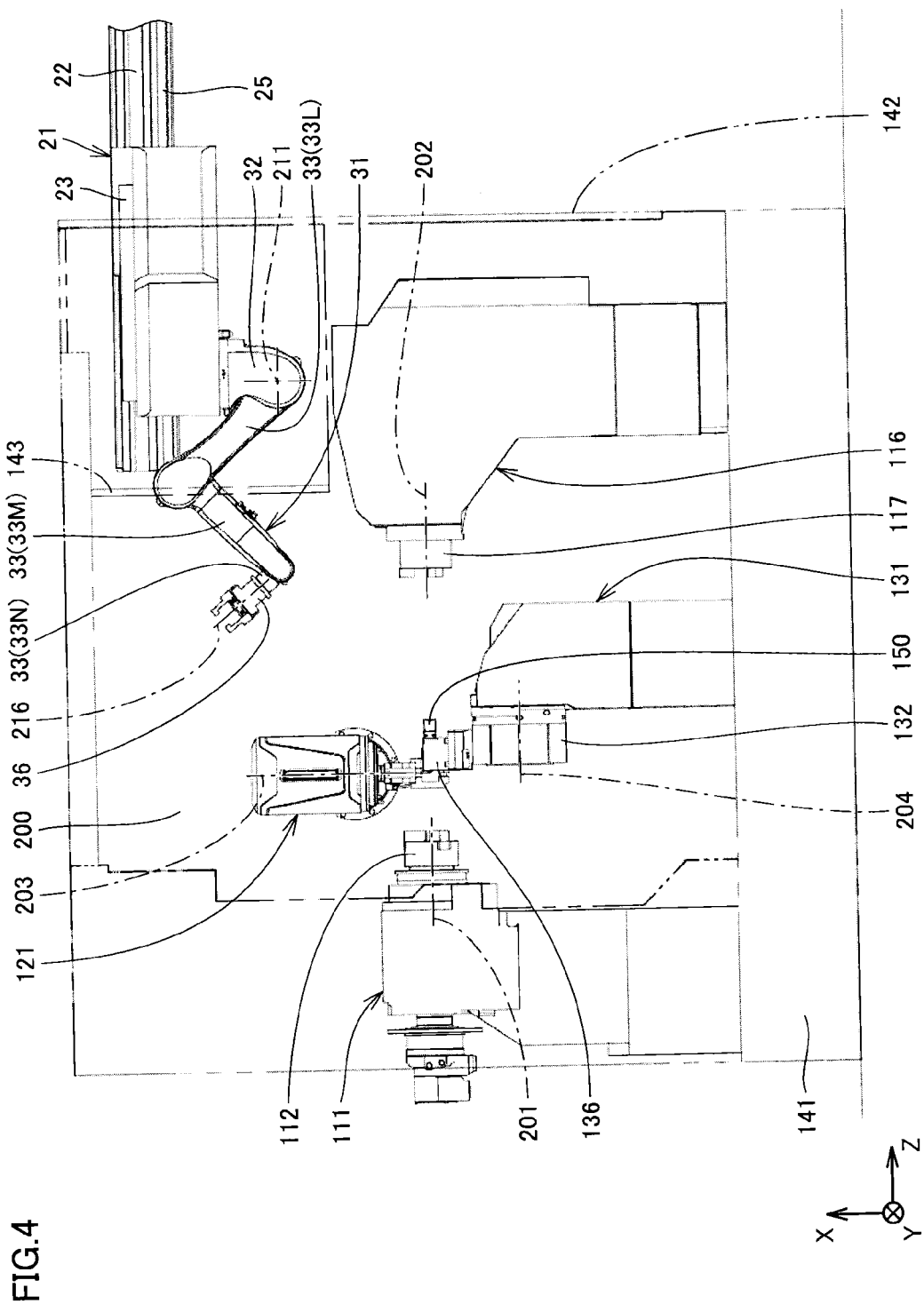
FIG. 4 is a side view showing the first movement of the robot arm at the time when automatically changing a tool attached to a lower tool rest in the machine tool in FIG. 1.

Referring to FIGS. 1 and 4, at the time when automatically changing a tool 150 attached to lower tool rest 131, robot arm 31 is moved in the Z-axis direction by movement mechanism unit 21 so as to be moved from standby position 31B into the machining area.

When robot arm 31 is moved from standby position 31B into the machining area, arm unit 33 is in a folded state. Specifically, the state of arm unit 33 is controlled such that first movable unit 33L extends in the obliquely upward direction from base unit 32, second movable unit 33M extends in the obliquely downward direction from first movable unit 33L, and third movable unit 33N extends in the obliquely upward direction from second movable unit 33M.

Figure 5:
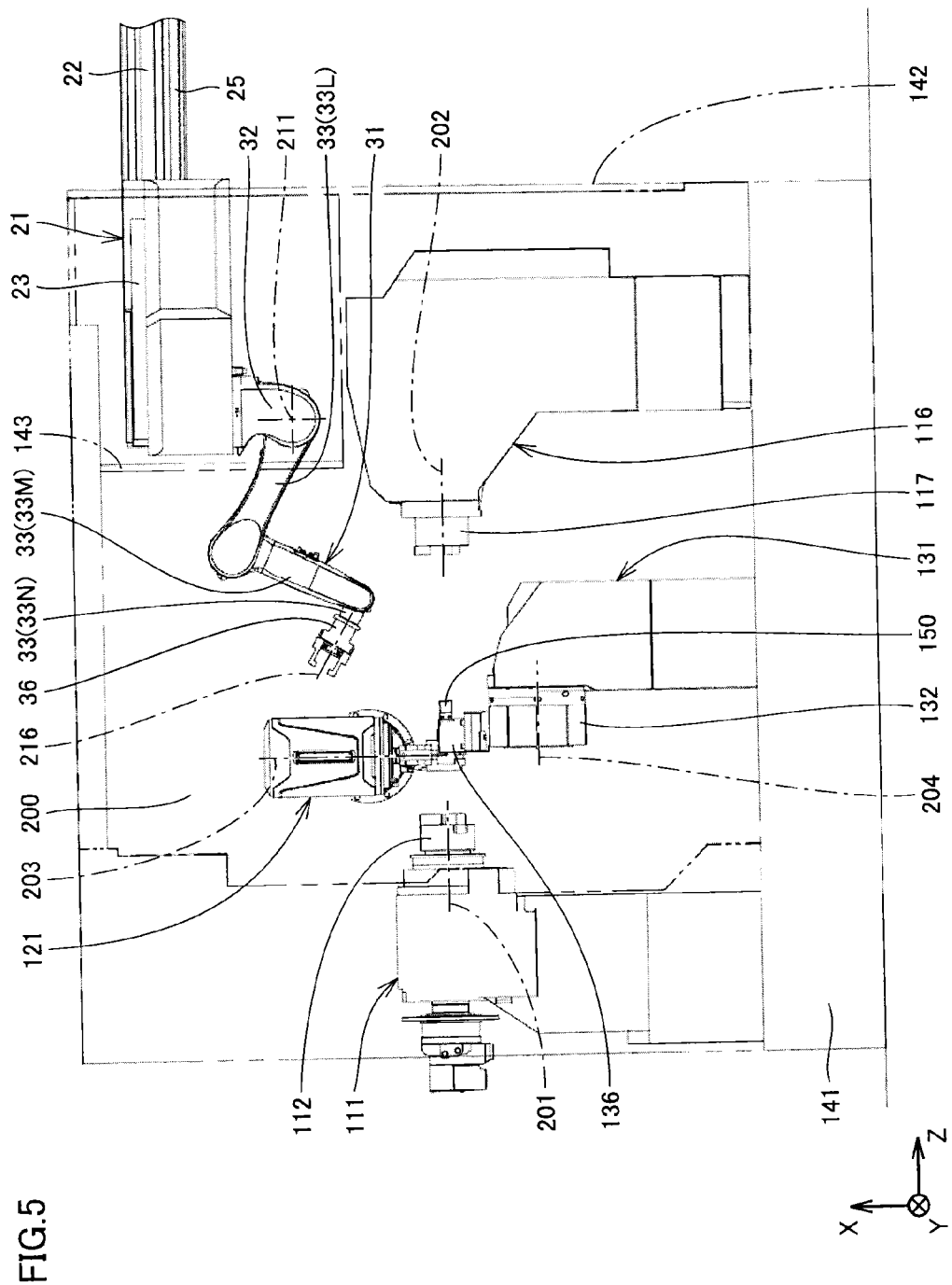
FIG. 5 is a side view showing the second movement of the robot arm at the time when automatically changing the tool attached to the lower tool rest in the machine tool in FIG. 1.
Figure 6:
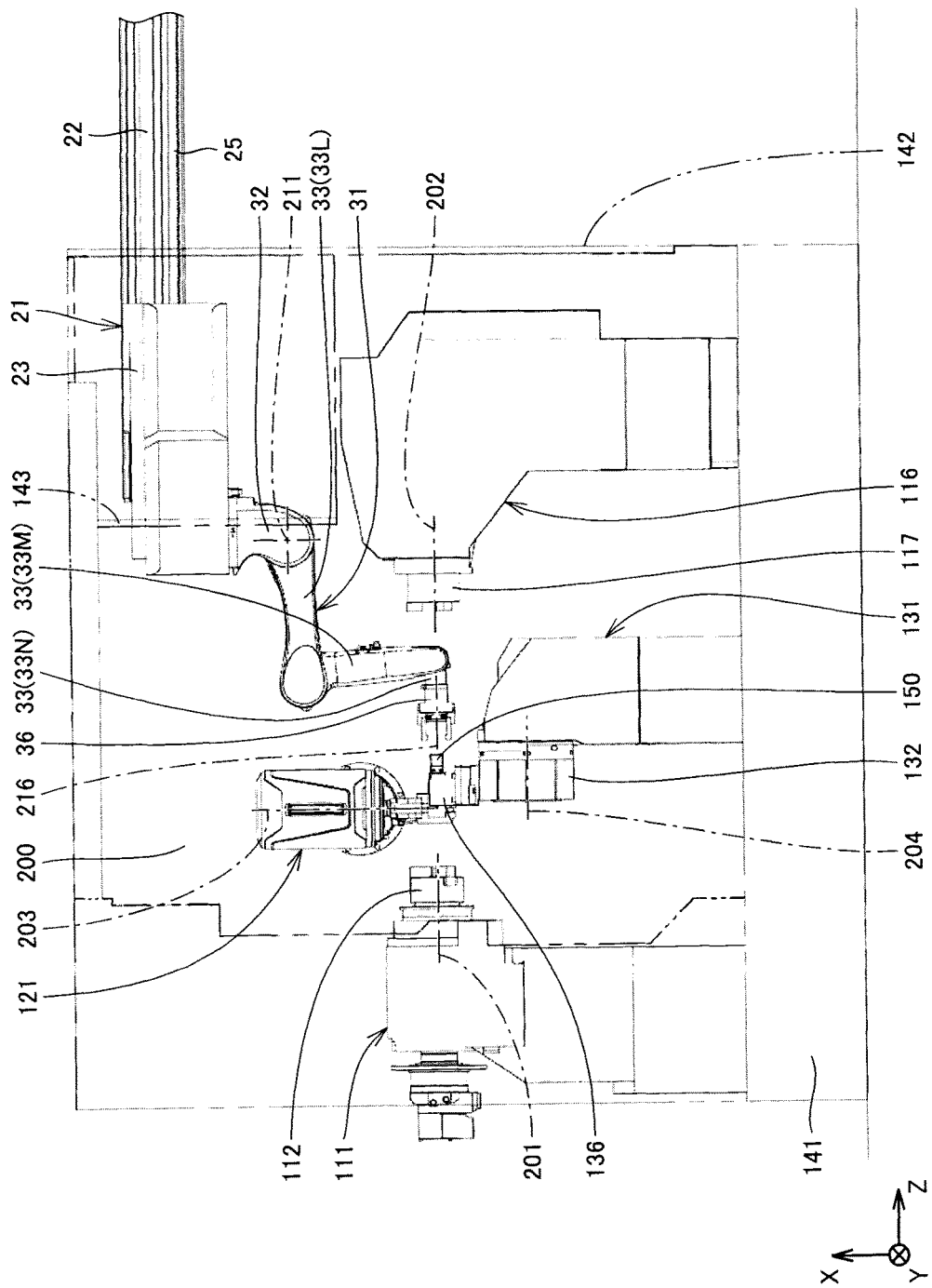
FIG. 6 is a side view showing the third movement of the robot arm at the time when automatically changing the tool attached to the lower tool rest in the machine tool in FIG. 1.

Referring to FIGS. 1, 5, and 6, while robot arm 31 is further moved in the Z-axis direction by movement mechanism unit 21, arm unit 33 is swung such that gripping unit 36 comes closer to tool 150 held by tool holder 136.

In the present embodiment, arm unit 33 (first movable unit 33L) is swung on pivot axis 211 as a fulcrum, to thereby move gripping unit 36 to the same height as that of tool 150 held by tool holder 136. At this time, arm unit 33 is placed in an attitude such that rotation axis 216 of third movable unit 33N extends in the direction parallel to the Z-axis. Tool 150 held by tool holder 136 is positioned along an imaginary extension line of rotation axis 216 of third movable unit 33N.

Third movable unit 33N is rotated about rotation axis 216, thereby adjusting the position of claw portion 38 of gripping unit 36 to that of tool 150 held by tool holder 136. The position of claw portion 38 that is different depending on the tool may be grasped by robot arm 31 reading data stored in a chip having a record of a tool ID and provided in the tool.

Figure 7:
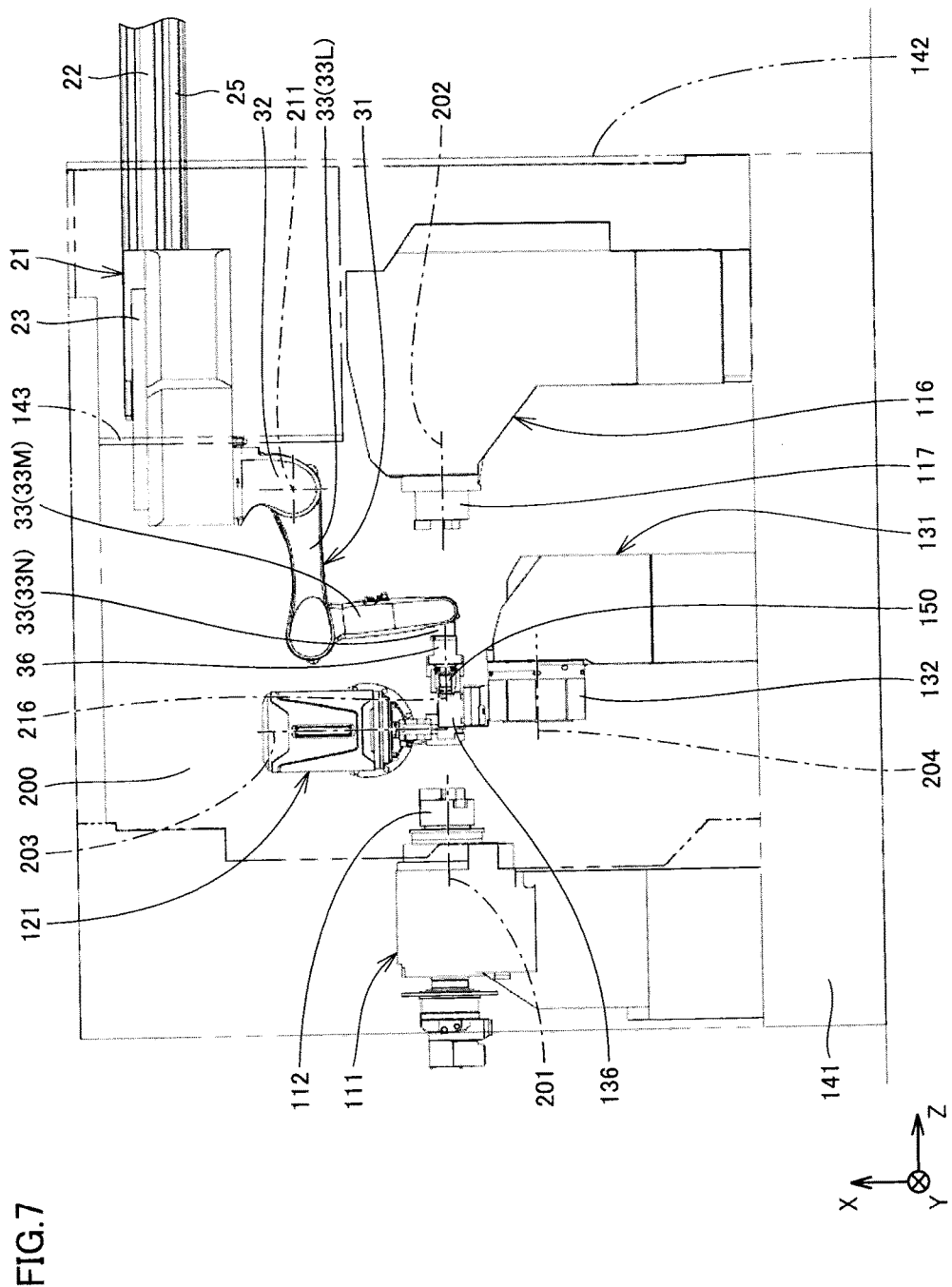
FIG. 7 is a side view showing the fourth movement of the robot arm at the time when automatically changing the tool attached to the lower tool rest in the machine tool in FIG. 1.

Referring to FIGS. 1 and 7, robot arm 31 is further moved in the Z-axis direction by movement mechanism unit 21 while maintaining the attitude of arm unit 33. Tool 150 held by tool holder 136 is gripped by gripping unit 36.

Figure 8:
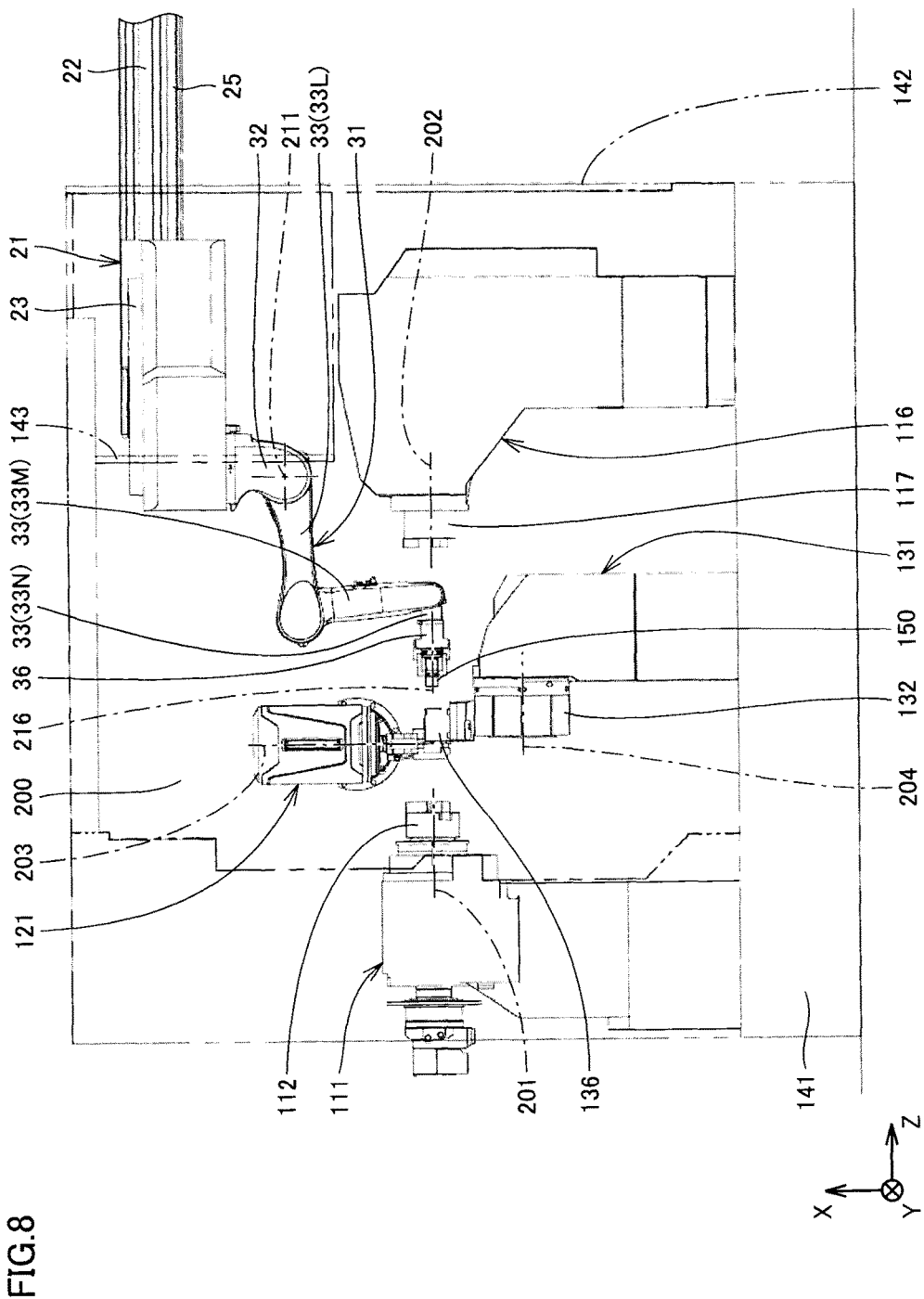
FIG. 8 is a side view showing the fifth movement of the robot arm at the time when automatically changing the tool attached to the lower tool rest in the machine tool in FIG. 1.

Referring to FIGS. 1 and 8, robot arm 31 is moved in the opposite direction along the Z-axis direction by movement mechanism unit 21 while maintaining the attitude of arm unit 33. Thereby, tool 150 is separated from lower tool rest 131.

Although the process of removing tool 150 attached to lower tool rest 131 has been described, robot arm 31 operates similarly also in the case where a replacement tool is attached to lower tool rest 131.

Referring to FIG. 1, at the time when changing the tool at stocker position 31C, six axes (pivot axes 211 to 213 and rotation axes 214 to 216) of robot arm 31 are controlled, so that gripping unit 36 is positioned appropriately or the attitude thereof is changed relative to the tool prepared in tool stocker 151.

In ATC 10 in the present embodiment, since an automatic change of the tool attached to lower tool rest 131 is carried out by robot arm 31 capable of moving on the inside and the outside of machining area 200, ATC 10 can be configured by a simple and compact mechanism. Accordingly, an increase in size of machine tool 100 can be prevented.

Furthermore, in the present embodiment, when the tool attached to lower tool rest 131 is attached and detached, arm unit 33 of robot arm 31 swings on pivot axis 211 as a fulcrum in the machining area (see FIGS. 4 to 8). Since pivot axis 211 extends in the direction orthogonal to central axes 201 and 202 (Y-axis direction) serving as the rotation axis of the workpiece in first headstock 111 and second headstock 116, robot arm 31 can be housed in a compact space particularly in the Y-axis direction. Consequently, excellent accessibility for an operator to a workpiece can be achieved.

The structure of ATC 10 in the first embodiment of the present invention as described above will be hereinafter summarized. ATC 10 in the present embodiment is provided as an ATC for automatically changing a tool attached to lower tool rest 131 as a tool rest of machine tool 100. ATC 10 includes robot arm 31 and movement mechanism unit 21 that moves robot arm 31 between the inside and the outside of machining area 200. Robot arm 31 has base unit 32 coupled to movement mechanism unit 21, arm unit 33 pivotably coupled to base unit 32, and gripping unit 36 provided in arm unit 33 and detachably gripping a tool. Arm unit 33 is formed to extend in an arm shape from base unit 32 toward gripping unit 36, and swings on pivot axis 211 as a fulcrum relative to base unit 32.

According to ATC 10 in the first embodiment of the present invention configured in this way, the tool attached to lower tool rest 131 can be automatically changed by a simple and compact mechanism.

In the present embodiment, by moving robot arm 31 in the Z-axis direction using movement mechanism unit 21 and by swinging arm unit 33 (first movable unit 33L) in robot arm 31, the tool attached to lower tool rest 131 is attached and detached, but the present embodiment is not limited to such a configuration. For example, starting from the attitude of robot arm 31 shown in FIG. 6, first movable unit 33L, second movable unit 33M, and third movable unit 33N may be swung on pivot axis 211, pivot axis 212, and pivot axis 213, respectively, each as a fulcrum, to thereby move gripping unit 36 in the Z-axis direction while being maintained at the height in the X-axis direction.

Insertion and removal of the tool into and from tool holder 136 can be done if robot arm 31 has one swing axis. The tool gripped by gripping unit 36 approaches tool holder 136 while drawing a path of a circular arc in accordance with the swinging motion of robot arm 31. When robot arm 31 has one swing axis, a mechanism capable of changing the height of the placing table of the tool may be provided in tool stocker 151 in order to allow tool replacement in tool stocker 151.

Furthermore, although an explanation has been given in the present embodiment with regard to the case where the present invention is applied to a composite processing machine having a turning function and a milling function, the present invention is applicable to a machine tool as long as it includes a tool rest for which a tool can be automatically changed.

Second Embodiment

Figure 9:
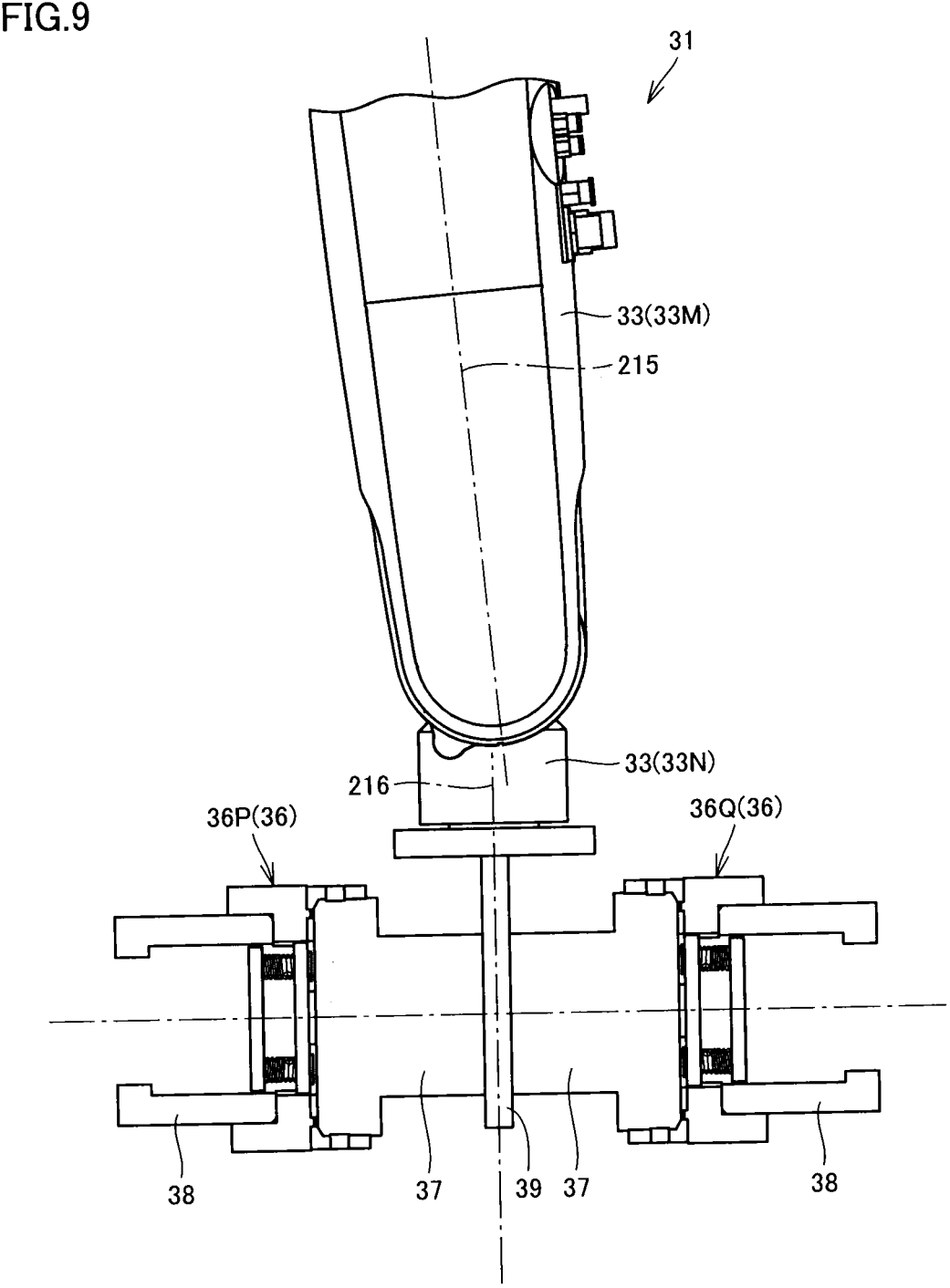
FIG. 9 is a side view showing an end portion of a robot arm according to an ATC in the second embodiment of the present invention.

FIG. 9 is a side view showing an end portion of a robot arm according to an ATC in the second embodiment of the present invention. The ATC in the present embodiment basically has a similar structure as compared with ATC 10 in the first embodiment. The description of the identical structure will not be hereinafter repeated.

Referring to FIG. 9, in the present embodiment, gripping unit 36 is of a double-arm type that is capable of gripping two tools at a time.

More specifically, robot arm 31 has gripping units 36P and 36Q, and a support plate 39. Support plate 39 is provided along an imaginary extension line of rotation axis 216 along which third movable unit 33N extends in an arm shape. Gripping units 36P and 36Q are provided on both sides across support plate 39.

Gripping units 36P and 36Q each has a gripping unit 36 that includes a coupling portion 37 and a claw portion 38. Coupling portion 37 is provided as a coupling mechanism for coupling claw portion 38 of each gripping unit to support plate 39. When third movable unit 33N rotates about rotation axis 216, the positions of gripping unit 36P and gripping unit 36Q are reversed.

According to such a configuration, robot arm 31 is moved toward the tool changing position within the machining area in the state where one of gripping unit 36P and gripping unit 36Q grips a replacement tool. Thereby, removal of the tool held by tool holder 136 and attachment of the replacement tool to tool holder 136 can be simultaneously performed.

According to the ATC in the second embodiment of the present invention configured in this way, the functions and effects described in the first embodiment can be similarly achieved.

The present invention is mainly applied to a machine tool provided with an ATC.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

What is claimed is:

1. An automatic tool changer (ATC) for automatically changing a tool attached to a tool rest of a machine tool, said ATC comprising:
   a robot arm;
   a movement mechanism unit configured to move said robot arm in a range of a tool changing position within a machining area, a standby position outside the machining area, and a stocker position outside the machining area; and
   a headstock configured to rotate a workpiece the headstock being provided within the machining area, wherein
   said robot arm includes
      a base unit coupled to said movement mechanism unit,
      an arm unit pivotably coupled to said base unit, and
      a gripping unit provided in said arm unit and detachably gripping the tool,
   said arm unit is formed to extend in an arm shape from said base unit toward said gripping unit and swinging on a pivot axis as a fulcrum relative to said base unit,
   said arm unit includes
      a first movable unit pivotably coupled to said base unit,
      a second movable unit pivotably coupled to said first movable unit, and
      a third movable unit pivotably coupled to said second movable unit and provided with said gripping unit, and
   said arm unit is configured to move in a space above said headstock in a folded state when said robot arm is moved from said standby position into the machining area, the folded state being a state where said first movable unit extends in an obliquely upward direction from said base unit, said second movable unit extends in an obliquely downward direction from said first movable unit, and said third movable unit extends in an obliquely upward direction from said second movable unit.

2. The ATC according to claim 1, wherein said base unit is provided so as to be rotatable about a first rotation axis orthogonal to the pivot axis of said arm unit.

3. The ATC according to claim 1, wherein
   a first pivot axis between said base unit and said first movable unit, a second pivot axis between said first movable unit and said second movable unit, and a third pivot axis between said second movable unit and said third movable unit are arranged in parallel.

4. The ATC according to claim 3, wherein
   said second movable unit is provided to extend in an arm shape in an axial direction of a second rotation axis orthogonal to said second pivot axis and to be rotatable about said second rotation axis, and
   said third movable unit is provided to extend in an arm shape in an axial direction of a third rotation axis orthogonal to said third pivot axis and to be rotatable about said third rotation axis.

5. A machine tool comprising:
   an automatic tool changer (ATC) for automatically changing a tool attached to a tool rest of a machine tool; and
   the tool rest disposed within a machining area and equipped with the tool automatically changed by said ATC, wherein
   said ATC includes
      a robot arm,
      a movement mechanism unit configured to move said robot arm in a range of a tool changing position within the machining area, a standby position outside the machining area, and a stocker position outside the machining area, and
      a headstock configured to rotate a workpiece, the headstock being provided within the machining area,
   said robot arm includes
      a base unit coupled to said movement mechanism unit,
      an arm unit pivotably coupled to said base unit, and
      a gripping unit provided in said arm unit and detachably gripping the tool,
   said arm unit is formed to extend in an arm shape from said base unit toward said gripping unit and swinging on a pivot axis as a fulcrum relative to said base unit,
   said arm unit includes
      a first movable unit pivotably coupled to said base unit,
      a second movable unit pivotably coupled to said first movable unit, and
      a third movable unit pivotably coupled to said second movable unit and provided with said gripping unit, and
   said arm unit is configured to move in a space above said headstock in a folded state when said robot arm is moved from said standby position into the machining area, the folded state being a state where said first movable unit extends in an obliquely upward direction from said base unit, said second movable unit extends in an obliquely downward direction from said first movable unit, and said third movable unit extends in an obliquely upward direction from said second movable unit.

6. The machine tool according to claim 5, wherein
   the tool is inserted from one direction into said tool rest when the tool is attached to said tool rest, and
   said movement mechanism unit moves said robot arm in a direction parallel to an insertion direction of the tool into said tool rest.

7. The machine tool according to claim 5, wherein a pivot axis of said arm unit is orthogonal to a rotation axis of the workpiece in said headstock.

* * * * *